United States Patent [19]
Parsons

[11] 4,033,527
[45] July 5, 1977

[54] DEFLATION CAP FOR PRESSURIZED HOT AIR AIRSHIP

[75] Inventor: Roger R. Parsons, Sioux Falls, S. Dak.

[73] Assignee: Raven Industries, Inc., Sioux Falls, S. Dak.

[22] Filed: Feb. 3, 1976

[21] Appl. No.: 654,858

[52] U.S. Cl. .................................. 244/99; 244/30
[51] Int. Cl.² .......................................... B64B 1/62
[58] Field of Search ............ 244/99, 30, 97, 128, 244/98

[56] References Cited

UNITED STATES PATENTS

| | | | |
|---|---|---|---|
| 1,283,773 | 11/1918 | Honeywell | 244/99 |
| 1,447,559 | 3/1923 | Lewis | 244/30 |
| 1,677,308 | 7/1928 | Stokes | 244/98 |

FOREIGN PATENTS OR APPLICATIONS

| | | | |
|---|---|---|---|
| 127,637 | 6/1919 | United Kingdom | 244/99 |
| 127,633 | 6/1919 | United Kingdom | 244/99 |

*Primary Examiner*—Trygve M. Blix
*Assistant Examiner*—Barry L. Kelmachter
*Attorney, Agent, or Firm*—Hill, Gross, Simpson, Van Santen, Steadman, Chiara & Simpson

[57] ABSTRACT

A hot air airship including an elongate aerodynamic shaped gas envelope carrying a pressure hot air generator system for pressurizing the envelope with heated air during flight with tail members at the aft end of the airship for guiding and directing the direction and attitude of flight, a gondola supported from the envelope for carrying the load including a push fan for propelling it in flight, a pressurizing blower and hot air generator for carrying with the ship, a deflation opening in the airship envelope having a cap over the elongate envelope with a netting sewn over the opening outwardly of the cap and the cap attached by Velcro along its edges and permanently attached at side edges so that the fore and aft edges can be pulled away from the opening.

11 Claims, 5 Drawing Figures

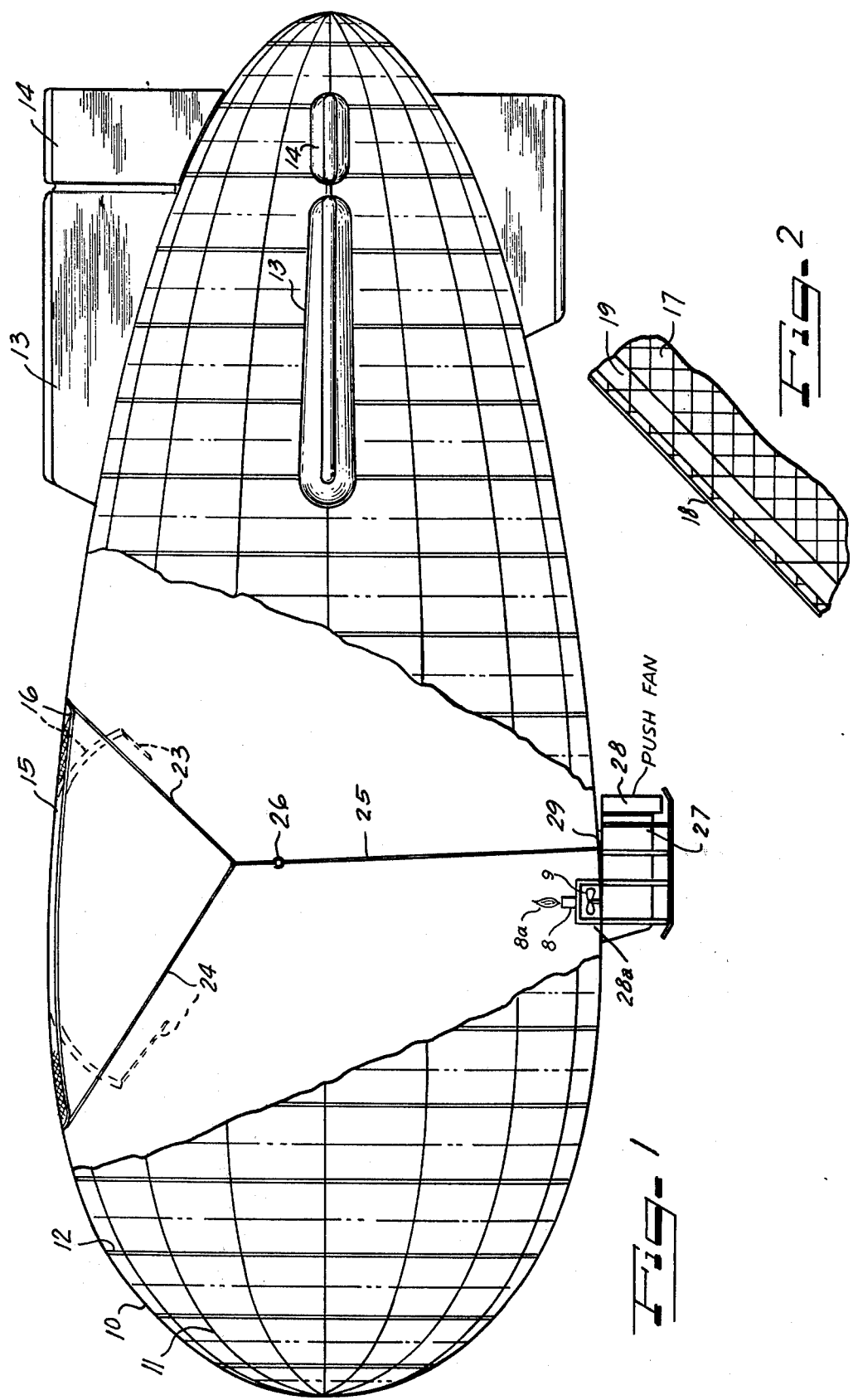

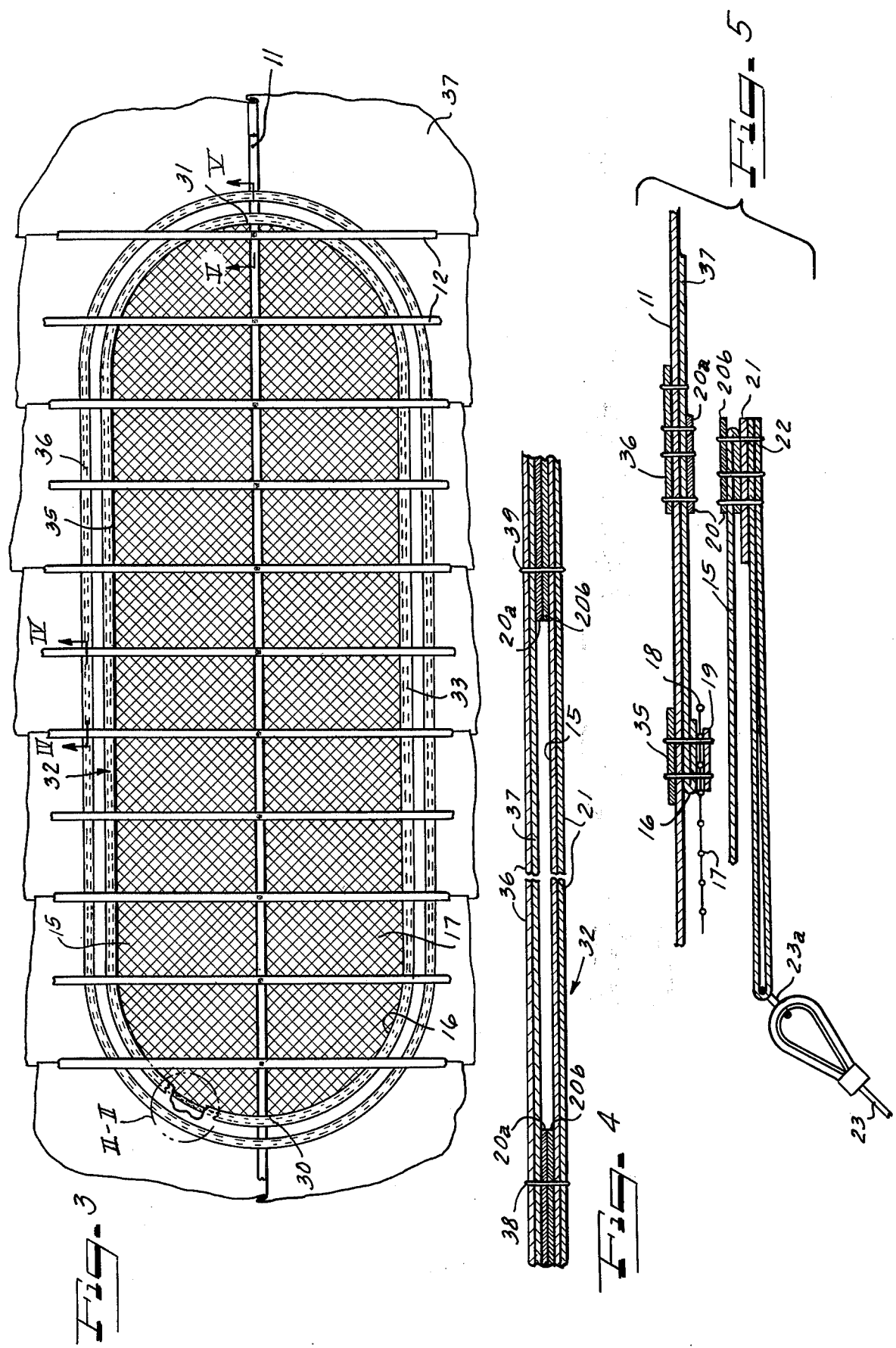

DEFLATION CAP FOR PRESSURIZED HOT AIR AIRSHIP

BACKGROUND OF THE INVENTION

The invention relates to improvements in vehicles for traveling through the atmosphere, and more particularly to a powered elongate flexible airship pressure inflated by hot air and capable of controlled flight for distances over the ground.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and nylon, or of suitable other material which is lightweight, extremely strong and resistant to gas diffusion. The envelope of the airship is horizontally elongate and is primarily symmetrical with load lines distributed over the body of the envelope for carrying a payload therebelow. The load lines are also particularly arranged to support hot gas pressure inflation means which preferably will be in the form of one or more propane fueled burners with a fan inflation means. The fan or blower which pressurizes the airship is driven by a suitable motor which may be propane or gasoline fueled.

The plastic fabric envelope when not in use can be folded and shipped or stored in the space which takes up less than 1% of its inflated volume. The envelope can be relatively rapidly inflated by the operation of the fan and the free lift is controllable by control of the burner which controls the temperature of the air within the envelope. The direction of flight is controlled by tail fins at the aft end of the balloon envelope. These tail surfaces preferably include a rigid or stable portion which stabilizes the airship in horizontal flight, and a manipulable portion which changes the direction of flight. Vertically extending control surfaces are pivoted to the left or right to change the direction of flight, and horizontally extending surfaces move up or down to cause the airship to ascend or descend. Primarily, the temperature of the hot air within the airship is controlled to provide sufficient lift for the weight of the envelope and the payload being carried so that essentially free lift is present while the airship is in flight, and it ascends or descends in accordance with the change in angle of the control tail surfaces. The tail surfaces primarily are arranged in a cruciform or X-shape so that so there are two horizontal extending surfaces and two vertical extending surfaces, but they may be also arranged in other forms such as the inverted Y-shape.

A problem of handling an airship of this type occurs in tethering the airship between flights and efficient effective use will permit completely deflating the airship at the end of the flight inasmuch as it can be rapidly and quickly reinflated and prepared for the next flight by the hot air generation means. The completely flexible envelope, therefore, can be collapsed and effectively stored in a relatively small space, and can be brought into a hanger or laid on the ground at a location where winds do not tug at it, and it can be kept at rest without having to be tethered or controlled. To attain these advantages and overcome the disadvantages of structures heretofore available, is contemplated by this invention to provide a means of quickly deflating the thermal airship. The deflation means must be provided without any possibility of deflation during flight and without adversely affecting the aerodynamic shape of the envelope. In accordance with the principles of the present invention, means is provided so that a top cap is mated to the airship envelope which can be rapidly removed, but which will be safely held in place during flight without bulging and without being forced away from the balloon.

It is accordingly an object of the present invention to provide a hot air pressurized powered airship with improved means of quickly deflating the airship on the ground at the end of flight.

A further object of the invention is to provide a closure deflation cap for a hot air pressurized elongate airship envelope wherein the cap does not bulge and retains the shape of the envelope without adversely affecting its aerodynamic profile.

A still further object of the invention is to provide a means where an elongate powered airship can be quickly deflated from the control area at the gondola at the end of the flight and wherein the deflation means provides a large opening in the wall of the envelope which opening can be safely and surely closed with a minimum of effort for the next flight.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

DRAWINGS

FIG. 1. is a side elevational view of an airship constructed and operating in accordance with the principles of the present invention;

FIG. 2 is an enlarged detailed fragmentary view of the edge of the netting at the side of the deflation opening taken at the location II—II shown in FIG. 3.

FIG. 3 is a fragmentary top plan view showing details of the deflation opening structure;

FIG. 4 is a detailed fragmentary sectional view taken substantially along line IV—IV of FIG. 3; and FIG. 5 is a fragmentary detailed sectional view shown somewhat in exploded form taken substantially along line V—V of FIG. 3.

DESCRIPTION

FIG. 1 shows an elongate airship envelope 10 which is formed of gores of material seamed such as at 11 with radial vertically extending reinforcing tapes 12. The envelope is aerodynamically shaped and horizontally elongate with tail members including a fixed tail member 13 and a movable tail member 14. The movable tail members 14 project vertically and horizontally for respectively controlling the direction and attitude of flight of the envelope. The members 13 are stabilizing fins, and preferably these structures are flexible and inflatable.

Beneath the airship is a gondola 27 for carrying a load supported by suitable vertical tapes or lines extending up around the airship envelope to distribute the load. An engine with a push fan 28 drives the airship forward in horizontal flight. A gas generator 8 expelling a flame 8a and pressurizing blower 9 are positioned in an envelope opening at 28a and are supported above the gondola.

In the wall of the balloon envelope is a deflation opening 16 which in the preferred is at the top of the envelope at the uppermost point for rapid deflation. Over the opening is a cap 15 beneath a reinforcing open netting 17. The netting is sewed over the opening at the edges and is of the size of the opening so as to hold the skin of flexible material of the envelope in its proper shape. The netting is opening so as to permit rapid flow of gas when the cap 15 is pulled away from the opening.

FIG. 2 shows the netting as formed of crisscross nylon heavy threads or lines, and at the edge a tape 19 supports the netting for attachment around the edge of the opening, and a reinforcing perimeter cord 18 is sewed at the edge of the netting. The position of the netting is also shown in the detailed illustration of FIG. 5 which may be related to its location in the opening from FIG. 3.

The tapes which extend circumferentially are shown at 12 in FIG. 3 as extending over the netting, and longitudinal seam tapes such as 11 crisscross the circumferential tapes and are sewed thereto such as by rectangular stitching with a crisscross through the rectangle for positional stability.

The opening is preferably elongate in shape with rounded ends extending in the axial direction of the airship. The cap is positioned beneath the netting and, therefore, is prevented from being blown out of the wall of the airship and is held firmly in place with the shape of the airship during flight. The airship itself is formed of a flexible material such as a nylon reinforced plastic, and the cap 15 may be formed of the same type of flexible material.

The cap is slightly larger than the opening and fits beneath the netting and is preferably firmly secured at its lateral edges at locations 32 and 33. As shown in FIG. 4, the secured area 32 has through stitching such as at 38 and 39 which secures the sides of the cap in place. Similar stitching is provided at the other side of the cap at location 33, FIG. 3. The stitching passes through the cap material 15 and a lower tape 21 at the edge of the cap. Pressure fastenable material such as Velcro is sewed around the edge of the cap with a mating piece outwardly of the edge of the opening so that the cap can be held in place by the pressure fastenable material. This material, as illustrated in FIG. 5, includes a strip of hook material 20a and a strip of mating pile material 20b with the combined strip indicated at 20. Other types of flexible fastening zipper arrangements may be used which provide for easy and quick attachment and for pulling detachment. The cap will be generally held in place by the pressure of the hot air within the balloon. The cap will be prevented from being blown out through the opening by the netting 17. At the termination of flight when the vehicle is on the ground, the ends of the cap are peeled back from the opening to permit the hot air to rapidly escape as shown by the broken line position of FIG. 1.

During flight, the balloon envelope is suitably pressured by a burner and a blower. This equipment is preferably secured in an air entry opening at the base of the balloon above the gondola 27 in the location shown in FIG. 1. During operation the fan will continue to pressurize the envelope continually, and the burner will be regulated to heat the incoming air at a rate to support the airship envelope and its payload.

Referring to FIGS. 3 and 5, it will be seen that at the edge of the opening 16, a shape holding tape 35 is sewn to the balloon material 37, with the stitching passing through the lower tape 19 which holds the netting in place.

Outwardly of the opening edge 16 is another tape 36 which is sewn to the balloon material 37. The balloon material is folded or doubled under the edge of the opening as shown at 16 in FIG. 5. The longitudinal tape 11 passes over the opening.

At the ends of the cap, as shown at 30 and 31 in FIG. 3, cap opening lines are secured. These permit the ends of the cap to be peeled back. As illustrated in FIG. 5, attachment loop 22 is sewn beneath the tape 21 at the edge of the cap 15, and to this loop a ring 23a permits connection of an opening line 23. A similar line 24 connects to the end 30 of the cap. These lines join in a Y to a common line 25 which passes downwardly through a series of guide rings such as 26 to a location 29 where it can be pulled downwardly from the gondola. Drawing down on the line 25 at the end of the flight will separate the Velcro tapes and peel the cap back opening the hot air escape opening and permitting deflation of the envelope.

Thus, there has been provided a horizontally elongated driven airship envelope which can be propelled under power and yet retain its shape in spite of a provision of a quick deflation opening at the very top of the airship. The opening safely secures the airship during flight, and the cap cannot be blown out because of the netting. In some forms it may be desirable to replace the netting by crossed webs, but this generally provides a more expensive construction. The cap can be quickly replaced by pressing the pressure sensitive Velcro back together when the envelope is to be reinflated. When this is done, and the heater and fan started, the airship envelope again will be quickly brought to its original flight shape. Various types of material may be used for the cap, and lightweight tough material is preferred, and a nylon reinforced plastic such as the material of the airship envelope may be employed. The cap removal lines may be of lightweight nylon or similar material.

I claim as my invention:

1. A thermal airship comprising in combination:
    a horizontally elongate airship envelope of flexible material;
    tail members at the aft end of said airship for guiding and directing the direction and attitude of flight;
    a gondola connected to the envelope for carrying a load;
    hot air generating means carried by the gondola for pressurizing the envelope during flight;
    propelling means carried by the gondola for propelling said airship in flight;
    means including opening edges and side edges defining a deflation opening in the airship envelope;
    a cap of flexible material having end and side edges extending over the opening;
    connecting means detachably connecting the cap to the opening edges so that in a deflating position the side edges of the cap remain attached to the side edges of the opening while the cap end edges are displaced from their original position;
    and reinforcing means extending across the opening secured to the edges of the opening and positioned outwardly of the cap relative to the envelope interior preventing the cap from being forced outwardly by hot air within the envelope.

2. A thermal airship constructed in accordance with claim 1:

wherein said opening is located at the top of the envelope and said connecting means comprises a pressure connecting continuous element having two surfaces which join by pressure normal to said surfaces and separate by peeling one of the surfaces away from the other.

3. A thermal airship constructed in accordance with claim 2:
including control means extending to the gondola for removing the cap from the gondola.

4. A thermal airship constructed in accordance with claim 1:
wherein said reinforcing means comprises a uniform continuous netting sewn to the envelope at the edge of the opening.

5. A thermal airship constructed in accordance with claim 1:
wherein said reinforcing means includes a plurality of criss-crossed webs joined at their edges to the sides of the opening.

6. A thermal airship constructed in accordance with claim 1:
wherein said opening is at the top of the envelope, the connecting means is Velcro, and connecting loops are formed at the edges of the cap for applying lateral cap removing pressure.

7. A thermal airship constructed in accordance with claim 1:
including cap removal lines secured to opposite edges of the cap and extending downwardly for applying a force to remove the cap from the opening.

8. A thermal airship constructed in accordance with claim 1:
wherein the opening is at the top of the balloon envelope and the cap is sewn to the side edges of the opening with the end edges of the cap being removably attached to the envelope at the opening edges of the opening.

9. A thermal airship constructed in accordance with claim 1:
wherein the opening is at a top of the balloon and is oblong in shape, the cap being secured to the lateral side edges of the oblong opening and the end edges of the cap being removably secured to the envelope at the opening edges of the opening.

10. A thermal airship constructed in accordance with claim 1:
including a first reinforcing tape means surrounding said deflation opening and a second reinforcing tape means located outwardly of the first tape means relative to the opening and supporting said connecting means.

11. A thermal airship comprising in combination:
a horizontally elongate airship envelope of flexible material;
tail members at the aft end of said airship for guiding and directing the direction and attitude of flight;
a gondola connected to the envelope for carrying a load;
hot air generating means carried by the gondola for pressurizing the envelope during flight;
propelling means carried by the gondola for propelling said airship in flight;
means including opening edges defining a deflation opening at the top of the airship envelope;
a cap of flexible material extending over the opening;
Velcro pressure attaching means detachably connecting the cap to the opening edges;
connecting loops formed at edges of the cap for applying cap removing pressure; and
reinforcing means extending across the opening secured to the edges of the opening and positioned outwardly of the cap relative to the envelope interior preventing the cap from being forced outwardly by hot air within the envelope.

* * * * *